(12) United States Patent
Burow et al.

(10) Patent No.: US 11,897,472 B2
(45) Date of Patent: Feb. 13, 2024

(54) METHOD FOR CONTROLLING A DRIVE MOTOR IN A MOTOR VEHICLE

(71) Applicant: AUDI AG, Ingolstadt (DE)

(72) Inventors: Clemens Burow, Munich (DE); Jürgen Bader, Munich (DE); Moritz Reiff, Freising (DE); Raphael Kis, Ingolstadt (DE); Siegfried Pint, Wettstetten (DE)

(73) Assignee: AUDI AG, Ingolstadt (DE)

( * ) Notice: Subject to any disclaimer, the term of this patent is extended or adjusted under 35 U.S.C. 154(b) by 255 days.

(21) Appl. No.: 16/383,859

(22) Filed: Apr. 15, 2019

(65) Prior Publication Data
US 2019/0337518 A1 Nov. 7, 2019

(30) Foreign Application Priority Data
May 7, 2018 (DE) ...................... 10 2018 207 079.2

(51) Int. Cl.
*B60W 30/18* (2012.01)

(52) U.S. Cl.
CPC ... *B60W 30/18172* (2013.01); *B60W 2520/26* (2013.01); *B60W 2520/28* (2013.01); *B60W 2552/40* (2020.02); *B60W 2710/081* (2013.01)

(58) Field of Classification Search
CPC ....... B60W 30/18172; B60W 2552/40; B60W 2520/26; B60W 2710/081
See application file for complete search history.

(56) References Cited

U.S. PATENT DOCUMENTS

| 5,127,501 | A | * | 7/1992 | Arikawa | ............. B60T 8/17616 |
| | | | | | 180/197 |
| 6,952,638 | B2 | * | 10/2005 | Sauter | .................... B60K 28/16 |
| | | | | | 701/84 |
| 9,387,843 | B2 | * | 7/2016 | Ziegler | .................. B60K 28/16 |
| 11,192,455 | B2 | * | 12/2021 | Greenwood | ............ B60L 3/106 |
| 2002/0056581 | A1 | | 5/2002 | Mianzo et al. | |
| 2003/0100405 | A1 | * | 5/2003 | Homeyer | .............. F02D 41/021 |
| | | | | | 477/174 |

(Continued)

FOREIGN PATENT DOCUMENTS

| CH | 648795 A5 | 4/1985 |
| CN | 206497571 U | 9/2017 |

(Continued)

OTHER PUBLICATIONS

Search Report dated Oct. 2, 2019, in corresponding European patent application No. 19165613.1 including partial machine-generated English language translation; 10 pages.

(Continued)

*Primary Examiner* — Aniss Chad
*Assistant Examiner* — Christopher George Fees
(74) *Attorney, Agent, or Firm* — Maier & Maier, PLLC

(57) ABSTRACT

A method for controlling a drive motor in a motor vehicle may include the steps: determining driving situation information which describes a static friction and/or a frictional connection of at least one wheel of the motor vehicle and/or a speed of the motor vehicle, determining a minimum speed of the drive motor as a function of the driving situation information, and regulating or controlling the speed of the drive motor as a function of the minimum speed, in particular such that the speed is always greater than the minimum speed.

7 Claims, 1 Drawing Sheet

(56) References Cited

U.S. PATENT DOCUMENTS

| | | | |
|---|---|---|---|
| 2003/0221889 A1 | 12/2003 | Sauter | |
| 2004/0040375 A1* | 3/2004 | Kadota | B60L 50/16 |
| | | | 903/902 |
| 2006/0025917 A1* | 2/2006 | Pandey | E02F 9/2079 |
| | | | 701/82 |
| 2006/0241843 A1* | 10/2006 | Matsuda | F02D 31/004 |
| | | | 180/197 |
| 2011/0125354 A1* | 5/2011 | Gottwick | B60L 7/18 |
| | | | 701/22 |
| 2015/0127237 A1* | 5/2015 | Blyth | B60W 30/18172 |
| | | | 701/70 |
| 2015/0360693 A1* | 12/2015 | Ienaga | B60W 30/18172 |
| | | | 701/90 |
| 2017/0282929 A1* | 10/2017 | Sakaguchi | B60K 28/16 |
| 2018/0257652 A1* | 9/2018 | Mueller | B60L 15/2045 |
| 2019/0100213 A1* | 4/2019 | Park | B60W 30/18172 |
| 2021/0129850 A1* | 5/2021 | Zdych | B60W 40/068 |

FOREIGN PATENT DOCUMENTS

| | | |
|---|---|---|
| DE | 36 05 600 A1 | 8/1987 |
| DE | 39 42 862 A1 | 6/1991 |
| DE | 37 36 010 C3 | 5/1995 |
| DE | 199 39 822 A1 | 2/2001 |
| DE | 10 2013 021 441 A1 | 7/2014 |
| DE | 102015222059 A1 | 5/2017 |
| DE | 10 2015 223 504 A1 | 6/2017 |
| EP | 1 272 752 B1 | 9/2005 |
| JP | H51590 A | 1/1993 |
| JP | 2898439 B2 | 6/1999 |
| JP | 2003-293818 A | 10/2003 |
| KR | 10-1975623 B1 | 5/2019 |
| WO | 2013/041311 A1 | 3/2013 |

OTHER PUBLICATIONS

Korean Office Action dated Mar. 10, 2020, in connection with corresponding KR Application No. 10-2019-0050447 (10 pgs., including machine-generated English translation).

Examination Report dated Jan. 10, 2019 of corresponding German application No. 10 2018 207 079.2; 16 pages.

Office Action dated Feb. 22, 2022, in connection with corresponding Chinese Application No. 201910370829.3 (11 pp., including machine-generated English translation).

* cited by examiner

METHOD FOR CONTROLLING A DRIVE MOTOR IN A MOTOR VEHICLE

FIELD

The disclosure relates to a method for controlling a drive motor in a motor vehicle.

BACKGROUND

So-called engine drag torque controls are used in motor vehicles to prevent wheels from locking or slipping when the vehicle is braked by an engine drag torque. This involves obtaining current traction information for the individual wheels, for example using a control unit of an electronic lane control system, and determining an optimum wheel slip or a sensible speed for the individual wheels of the vehicle. If the current speed of the respective wheel falls below this limit value, a drive torque is increased such that the desired wheel speed is not undershot. Since individual wheel drive is often not possible, control is often performed for the currently most critical wheel of the driven axle or, in the case of four-wheel driven vehicles, the most critical wheel of the vehicle.

A torque specification of such an engine drag torque control, which is intended to prevent the wheels from locking or slipping due to drag torques, can be combined with other torque specifications via a torque coordinator, e.g. with torque specifications of a stall protection controller or an idling controller and with torque specifications due to accelerator pedal activation by the driver. This is known, for example, from publication EP 1 272 752 B1.

The described procedure results in a relatively complex and long control loop, as for example, at least two control units, namely the control unit of the electronic lane control system and an engine control unit, are involved in the control. As control units for electronic lane control systems typically have to communicate with a large number of vehicle systems, such as the braking system, the drive system, any steering actuators, etc., the maximum achievable timing of an appropriate regulation or control system is very limited. As the length of the controlled system also reduces the phase reserve of the control system, a corresponding control system should be damped relatively strongly in order to avoid instabilities.

Together, these factors can result in the control system not being fast enough in all operating situations to limit slip resulting from a drag torque. This leads to excessive brake slip, which typically has to be greatly reduced due to the shape of the traction-slip curve between the wheel and the road surface in order to restore stable driving behavior. The wheel may even have to be driven in order to reduce the brake slip again. Overall, in some cases this can result in a lack of lane stability or steering ability, at least for a short time, or a reduction in speed can be slower than ideally desired.

SUMMARY

The invention is therefore based on the object of specifying a comparatively improved method for controlling a drive motor.

In accordance with the disclosure, an object is achieved by a method of the kind mentioned at the beginning, which comprises the following steps:

determining driving situation information which describes a static friction and/or a frictional connection of at least one wheel of the motor vehicle and/or a speed of the motor vehicle, determining a minimum speed of the drive motor as a function of the driving situation information, and regulating and controlling the speed of the drive motor as a function of the minimum speed, in particular such that the speed is always greater than the minimum speed.

These steps can be used in particular to implement an engine drag torque control or to replace it with the described procedural steps. Here it was recognized that a used controlled system can be shortened by directly regulating or controlling the speed of the drive motor instead of the wheel speed. If the effect of a drive differential is initially neglected, the speed of the drive motor directly determines the speed of the driven wheels, so that a wheel speed minimum for the individual wheels is also specified as a result. Compared to a control of the individual wheel speeds, however, several advantages are achieved.

On the one hand, the change in the minimum speed is limited by the actual maximum vehicle deceleration. It is therefore less dynamic than the torque specifications for controlling the individual wheel speeds determined by previous engine drag torque control systems. Communication lines in the vehicle can therefore be relieved.

In addition, the speed of the motor is controlled or regulated directly instead of providing a longer controlled system. In particular, this makes it possible to implement the control itself on a control unit of the drive motor, thus achieving a considerably shorter controlled system and significantly increasing the clock rate of the controller. Therefore, less phase reserve is required, which means that the control itself can be carried out faster, i.e. at a lower degree of damping. The result is that a desired slip can be precisely controlled, resulting in higher deceleration and shorter braking distances, while at the same time improving track stability and steering ability. In addition, the simplified control can reduce the complexity of the controller application and less functionality needs to be provided by a separate controller, which can result in overall cost savings.

The minimum speed can practically be determined continuously or at least repeatedly. The driving situation information can, for example, describe a predicted or estimated traction-slip curve. Such traction-slip curves describe the relationship between the slip of a wheel and an effective coefficient of friction or effective deceleration in the longitudinal direction of the motor vehicle. In order to achieve a speed reduction at all, there must be a certain amount of slip. The traction-slip curve initially increases approximately linearly with increasing slip until a maximum deceleration or a maximum effective friction is achieved. With even higher slip, the deceleration achieved or the effective static friction force decreases again, resulting in unstable driving behavior, as the grip between the wheels and the road decreases with increasing slip and the vehicle therefore slips even more. In addition or alternatively, a static friction value can be determined as driving situation information, i.e. in particular the maximum of such a traction-slip curve.

An estimation of current traction-slip curves or maximum static friction values for a driving situation is known in principle from the field of electronic lane control systems and will therefore not be explained in detail. In principle, for example, several discrete traction-slip curves can be specified. For example, one of these traction-slip curves can be selected depending on the detection of a road surface, for example by means of data from a navigation device and/or a camera, the weather, which can be detected for example by means of a rain sensor, by data from an external data source and/or also by means of a camera, and/or other prior knowledge, for example by tire data stored in a vehicle system.

However, it is also possible to determine and/or adapt the driving situation information, in particular the traction-slip curve, during driving operation. Wheel slip can be determined, for example, by monitoring the wheel speeds of driven and non-driven axles. The driving and braking torques transmitted to the individual wheels may also be known, so that a traction-slip curve can be gathered or updated for the individual wheels at least in sections during driving operation.

The drive motor can be controlled or regulated as a function of a preset target torque if the speed exceeds the minimum speed or another speed limit greater than the minimum speed. In particular, the method according to the invention may provide for a switching or cross-fading between a torque dependent control or regulation at sufficiently high speeds and a minimum speed dependent control or regulation at low speeds. The speed limit value can be determined as a function of the minimum speed, for example by multiplying the minimum speed by a specified or minimum speed-dependent factor.

The specified target torque can be specified by a control device of the motor vehicle, which in particular can aggregate the torque requirements of several sources and outputs an overall requirement depending on the individual torque requirements. The target torque can, for example, depend on a driving torque preset by the driver or by a longitudinal driver assistance system. In addition, however, the specified target torque can be influenced by a control unit for electronic lane control, idle speed control, stall protection or similar.

The control or regulation of the drive motor as a function of the specified target torque can therefore essentially correspond to the control or regulation of the drive motor described above and known from the prior art. In contrast, however, adherence to the minimum speed is guaranteed, i.e. in particular, the speed of the drive motor is prevented from falling below the current minimum speed, irrespective of the specified target torque, in order to prevent individual wheels from slipping or locking.

A minimum wheel speed dependent on the driving situation information can be determined for the wheel or at least one of the wheels of the motor vehicle, the minimum speed for the drive motor being determined as a function of the minimum wheel speed. As already mentioned at the beginning, the effect of a differential between different wheels can first be neglected, so that a defined transmission ratio between the speed of the wheel and the speed of the drive motor is specified by the transmission or drive train of the motor vehicle, so that the minimum speed for the drive motor can be calculated directly from the minimum wheel speed. Since the minimum wheel speed, as will be explained in more detail below, must be chosen such, that no excessive slip occurs, it can be assumed, at least when driving straight ahead, that the wheel speeds of the wheels of one axle are the same, so that an existing differential can be neglected. However, it is also possible, for example when taking a corner, to take into account predicted speed differences of the wheels of a driven axle due to a differential, so that different virtual ratios can result for the different wheels of a driven axle.

In the method according to the invention, several wheels of the motor vehicle can be taken into account. A respective minimum wheel speed can be determined for several wheels of the motor vehicle, whereby the minimum speed is determined as a function of the largest wheel speed minimum, or the wheel speed minimum can be determined for the wheel with the largest current slip and used to calculate the minimum speed. In other words, the most critical wheel on the driven axle or motor vehicle can be taken into account for determining the minimum speed, i.e. the wheel for which there is a maximum risk of entering an unstable operating range, where it is blocked or slips severely.

The minimum wheel speed can be determined such that the slip of the wheel or wheel in question at the speed of the motor vehicle is less than that at which maximum traction is achieved between the wheel and the ground. The driving situation information can, as already explained, specify a traction-slip curve or at least allow an estimation of the position of the maximum of the traction-slip curve. If the slip for a wheel is lower than this maximum, a further increase in slip leads to a higher effective static friction value or traction and thus to stronger braking. However, a slip beyond the maximum typically results in the effective static friction dropping further as the slip increases, so that a braking effect drops further and track stability decreases.

The resulting slip can be calculated directly from the speed of the motor vehicle with known wheel geometry at a certain wheel speed. With the method according to the invention, an optimum slip which is smaller than the slip at which maximum traction is achieved can be selected and a wheel speed can be calculated which results from this slip at the current speed of the motor vehicle. This can correspond to the minimum wheel speed.

In addition to the method according to the invention, the invention relates to a motor vehicle which is configured to execute the method according to the invention. The motor vehicle may have a control device which, in at least one mode of operation of the motor vehicle, executes the method according to the invention.

The motor vehicle can comprise a first control unit configured to determine the minimum speed for the drive motor and to communicate the minimum speed to a second control unit associated with the drive motor, the second control unit being configured to control or regulate the drive motor as a function of the minimum speed. In at least one operating mode of the motor vehicle, the minimum speed is therefore determined by the first control unit and transmitted to the second control unit, after which the second control unit controls or regulates the drive motor as a function of the minimum speed. As already explained at the beginning, a very short control loop can be realized by such a structure of the motor vehicle, which enables very fast control of the speed of the drive motor, whereby the overall driving behavior of the motor vehicle can be significantly improved compared to a conventional engine drag torque control.

BRIEF DESCRIPTION OF THE DRAWINGS

Further advantages and details of the invention result from the following exemplary embodiments and the associated drawings.

DETAILED DESCRIPTION

Figure 1:
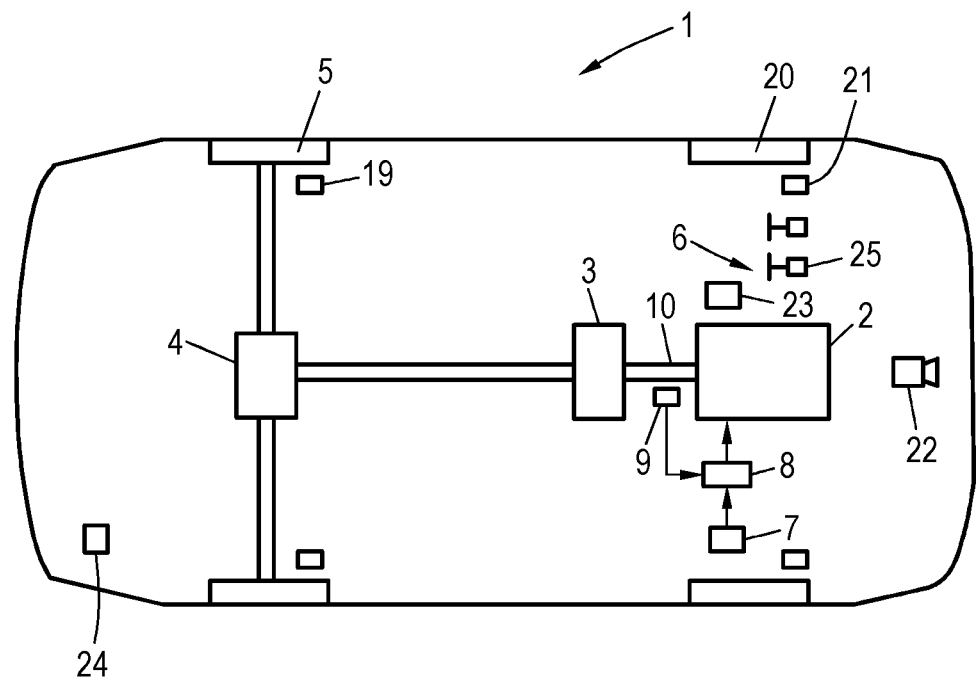
FIG. 1 shows an exemplary embodiment of a motor vehicle according to the invention by means of which an exemplary embodiment of the method according to the invention can be executed.

FIG. 1 shows a motor vehicle 1 with a drive motor 2, which drives wheels 5 of the rear axle of motor vehicle 1 via a gearbox 3 and a differential 4. In particular, if the drive motor 2 is a combustion engine, drag torques can occur which brake wheels 5, for example if a driver suddenly releases accelerator pedal 6. In this case, wheels 5 can lock or slip in the event of excessively braking, which on the one hand reduces the braking force actually transmitted to the road and on the other hand reduces the lane stability of motor vehicle 1. It is known that in such driving situations a driver assistance system of the motor vehicle artificially increases a torque requirement on drive motor 2 in order to avoid strong slippage or blocking of wheels 5. However, as this leads to relatively long controlled systems, a different approach is used in motor vehicle 1 to avoid or reduce blocking or excessive slippage of wheels 5 when the torque demand is reduced.

For this purpose, driving situation information describing static friction or frictional engagement of wheel 5 and the speed of motor vehicle 1 are gathered during running operation by a first control unit 7 which implements, for example, an electronic stability control of motor vehicle 1. In particular, a traction-slip curve, which describes the relationship between slip and effective adhesion value, can be determined, adapted or selected as a function of the current driving situation. Depending on these parameters, a minimum speed for drive motor 2 can be determined, as will be explained in more detail later, whereby blocking or excessive slippage of wheels 5 can be avoided if undershooting of the minimum speed is prevented. This minimum speed is transmitted to a second control unit 8, which is part of the motor control of drive motor 2, after which this second control unit 8 regulates the speed of drive motor 2 such, that that the speed of drive motor 2 is always greater than the minimum speed. For this purpose, for example, the speed of an output shaft 10 can be monitored via a speed sensor 9 and the speed of drive motor 2 can be controlled to a value above the minimum speed by means of a corresponding torque specification.

Figure 2:
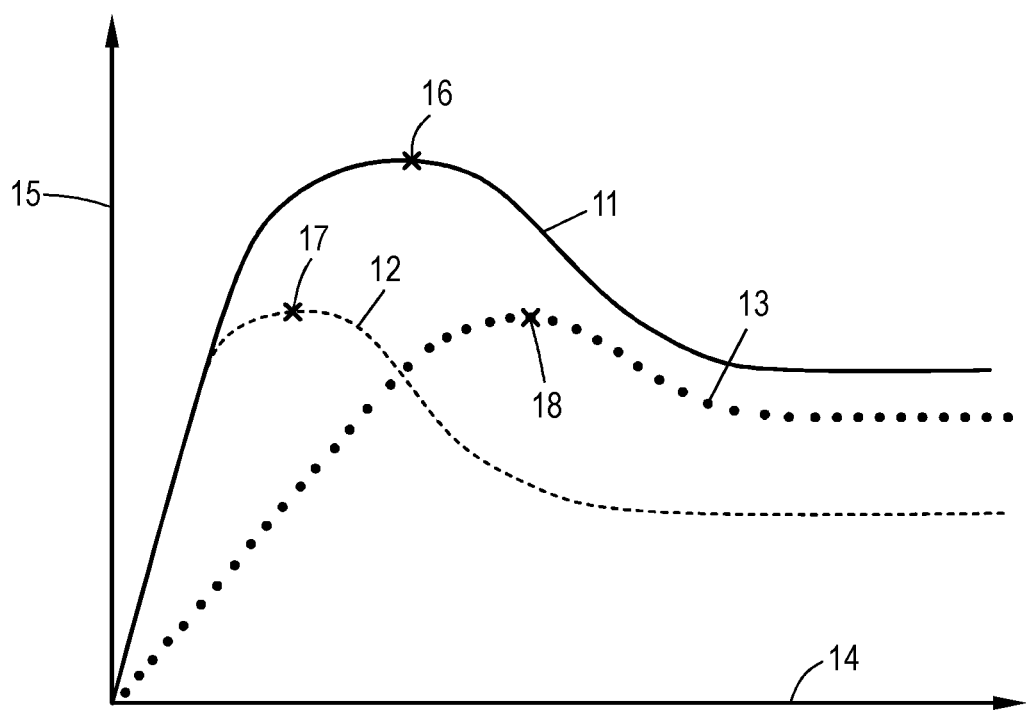
FIG. 2 shows three exemplary traction-slip curves for different driving situations.

To determine the minimum speed, a traction-slip curve can be used for the current driving situation. FIG. 2 shows examples of traction-slip curves 11, 12, 13 which can occur in various driving situations. The slip for respective wheel 5 is plotted to the right along axis 14, and the actual traction or usable static friction value is plotted upwards along axis 15. Curves 11, 12, 13 differ with regard to weather conditions and the road surface. Curve 11 describes the traction on dry asphalt, curve 12 on wet asphalt, and curve 13 on loose ground such as gravel.

The slip of wheel 5 depends on the wheel speed of wheel 5 and the speed of the motor vehicle. For example, the circumference of wheel 5 may be stored in control unit 7 so that slip can be calculated for a given wheel speed at a given speed. If the slip is smaller than the slip for which maximum 16, 17, 18 of currently relevant adhesion/slip curve 11, 12, 13 is reached, the driving behavior can be regarded as stable, as a further slippage increase leads to a further increase in the effective traction value and the braking force. Slippage beyond this point results in unstable driving behavior, which must be avoided.

If traction-slip curve 11, 12, 13 is known for a current driving situation, then a minimum wheel speed can be determined for wheel 5, which indicates a wheel speed of wheel 5 at which the slip of wheel 5 at the current speed of motor vehicle 1 is smaller than the slip at which a maximum traction-slip between wheel 5 and the ground is achieved. As wheels 5 are coupled to drive motor 2 via gearbox 3, the minimum speed for drive motor 2 can be calculated directly from this minimum wheel speed, for which this minimum wheel speed is maintained, if the transmission ratio of gearbox 3 and the further powertrain is known.

In motor vehicle 1, the slip of two wheels 5 of the rear axle must be monitored for engine drag torque control. A four-wheel drive would even require monitoring of all four wheels. The described procedure can be executed for the most critical of driven wheels 5, i.e. for the wheel for which the strongest slip currently occurs. The slip of wheels 5 can be determined by monitoring the wheel speeds of wheels 5 via speed sensors 19. A slip can be calculated depending on the current speed. The speed can be determined, for example, by monitoring the speeds of non-driven wheels 20 with additional speed sensors 21. In addition or alternatively, position data from a navigation system 23 and/or video data from a camera 22 can be evaluated to determine the current vehicle speed.

Previous knowledge stored in control unit 7 can be used to determine currently applicable traction-slip curve 11, 12, 13. For example, traction-slip curves 11, 12, 13 for different grounds and/or weather conditions may already be stored there, or a traction-slip curve can be specified, which can be parameterized by one or more parameters determined during driving operation. The profile of the traction-slip curve depends in particular on the current weather conditions and the ground. Information about weather conditions can, for example, can be captured by camera 22, received wirelessly via a communication device 24, or retrieved from a server. Video data from camera 22 can also be evaluated to determine the road surface and/or route information from navigation system 23 describing the ground can be read out. Traction-slip curve 11, 12, 13 determined as a function of the above information can be corrected or adapted during ongoing driving operation. In particular, it is possible to monitor which torques are transmitted to wheels 5 and which slip results from each of these respectively.

In addition to the described control or regulation of the speed of drive motor 2 such that a minimum speed determined for the current driving situation is not undershot if possible, drive motor 2 must be controlled as a function of a torque specification as long as this condition is met. For this purpose, control unit 7 specifies a target torque for drive motor 2 via control unit 8. In particular, this target torque may depend on a position of accelerator pedal 6 detected by sensor 25. This target torque can be modified by other vehicle systems, such as idle speed control, stall protection, electronic stability control or similar. The control unit 8 can be configured such that the drive motor is controlled as a function of the target torque if a speed limit value is exceeded. Here it is possible to execute a hard switch between speed-based regulation or control and torque-based regulation or control as a function of a current speed. Preferably, however, the regulation or control methods are superimposed.

The invention claimed is:

1. A method for controlling a drive motor in a motor vehicle, comprising:
   determining driving situation information which describes a static friction and a frictional connection of at least one wheel of the motor vehicle with a road surface and a speed of the motor vehicle,
   determining a minimum speed of the drive motor as a function of the driving situation information based on at least one traction-slip curve describing a relationship between wheel slip of the at least one wheel of the motor vehicle and an actual traction value for a specific driving condition based on weather conditions and the road surface, wherein the at least one traction-slip curve includes a maximum slip point below which the driving situation is considered stable and above which the driving situation is considered unstable;

monitoring, via a first speed sensor, an actual speed of an output shaft to determine a torque specification;

monitoring, via a second speed sensor, a wheel speed of the at least one wheel of the motor vehicle to calculate the wheel slip of the at least one wheel of the motor vehicle; and regulating or controlling the speed of the drive motor based on the determined torque specification and the calculated wheel slip as a function of the minimum speed of the drive motor, such that the speed of the drive motor is always greater than the minimum speed and the maximum slip point is not exceeded, wherein the regulating or controlling switches between speed-based regulation or control to torque-based regulation or control after a current speed of the drive motor exceeds a specified multiple of the minimum speed of the drive motor.

2. The method of claim 1, further comprising:

controlling or regulating the drive motor as a function of a preset target torque after the speed of the drive motor exceeds the minimum speed or another speed limit greater than the minimum speed.

3. The method of claim 2, further comprising:

determining a minimum wheel speed dependent on the driving situation information for the at least one wheel of the motor vehicle; and determining the minimum speed of the drive motor as a function of the minimum wheel speed.

4. The method of claim 1, further comprising:

determining a minimum wheel speed dependent on the driving situation information for the at least one wheel of the motor vehicle; and determining the minimum speed of the drive as a function of the minimum wheel speed.

5. The method of claim 4, further comprising:

determining a respective minimum wheel speed is determined for several wheels of the motor vehicle as either a function of a largest wheel speed minimum or for a wheel with a largest current slip.

6. The method of claim 5, further comprising:

determining the minimum wheel speed such that the slip of the wheel or the respective wheel at the speed of the motor vehicle is less than the slip at which maximum traction is achieved between the wheel and the ground.

7. The method of claim 4, further comprising:

determining the minimum wheel speed such that the slip of the wheel or the respective wheel at the speed of the motor vehicle is less than the slip at which maximum traction is achieved between the wheel and the ground.

* * * * *